(12) United States Patent
Kemper (10) Patent No.: US 8,560,895 B2
(45) Date of Patent: Oct. 15, 2013

(54) DISTILLATION AND RECONSTRUCTION OF PROVISIONING COMPONENTS

(75) Inventor: David J. Kemper, Portland, OR (US)

(73) Assignee: Tibco Software Inc., Palo Alto, CA (US)

( * ) Notice: Subject to any disclaimer, the term of this patent is extended or adjusted under 35 U.S.C. 154(b) by 41 days.

(21) Appl. No.: 13/116,528

(22) Filed: May 26, 2011

(65) Prior Publication Data

US 2011/0296254 A1 Dec. 1, 2011

Related U.S. Application Data

(60) Provisional application No. 61/348,723, filed on May 26, 2010.

(51) Int. Cl.
*G06F 11/00* (2006.01)

(52) U.S. Cl.
USPC ............... 714/48; 714/44; 717/120; 717/124

(58) Field of Classification Search
USPC ................................ 714/44, 48; 717/120, 124
See application file for complete search history.

(56) References Cited

U.S. PATENT DOCUMENTS

| | | | | |
|---|---|---|---|---|
| 7,299,385 | B2 * | 11/2007 | Voigt ............................... | 714/57 |
| 7,363,546 | B2 * | 4/2008 | Duncan ........................... | 714/40 |
| 2004/0046785 | A1 * | 3/2004 | Keller ............................ | 345/734 |
| 2005/0044531 | A1 | 2/2005 | Chawla et al. | |
| 2005/0210462 | A1 | 9/2005 | Chupa et al. | |
| 2006/0026451 | A1 * | 2/2006 | Voigt ............................... | 714/2 |
| 2007/0073699 | A1 | 3/2007 | Reed | |
| 2008/0072219 | A1 | 3/2008 | Kabadiyski | |
| 2008/0077680 | A1 | 3/2008 | Dellarole et al. | |
| 2010/0085963 | A1 | 4/2010 | Bekiares et al. | |

OTHER PUBLICATIONS

PCT/US2011/038120, International Search Report and Written Opinion mailed Feb. 9, 2012.

* cited by examiner

*Primary Examiner* — Charles Ehne
(74) *Attorney, Agent, or Firm* — Baker & McKenzie LLP (57) ABSTRACT

Disclosed is a method for archiving provisioning errors that may occur during provisioning of a computing environment having configurable components. The method may comprise distilling a provisioning request, wherein the distilling the provisioning request includes recording, in a provisioning archive, a provisioning request component, and filtering the provisioning request component. The provisioning request component may comprise a component requested to be added to, removed from, and/or updated in the computing environment. The method may further comprise distilling a provisioning target, wherein the distilling the provisioning target includes recording, in the provisioning archive, a target environment, and filtering an existing component of the target environment. Additionally, the method may comprise applying the provisioning request to the provisioning target, including provisioning the target environment, resulting in an updated provisioning target. Furthermore, the method may comprise determining if a provisioning error occurred, and adding the provisioning error, if any, to the provisioning archive.

20 Claims, 8 Drawing Sheets

DISTILLATION AND RECONSTRUCTION OF PROVISIONING COMPONENTS

CROSS REFERENCE TO RELATED APPLICATIONS

This application relates and claims priority to U.S. Provisional Patent Application No. 61/348,723 entitled, "Distillation and reconstruction of provisioning components," filed May 26, 2010, which is herein incorporated by reference.

TECHNICAL FIELD

This disclosure generally relates to solving provisioning and deployment problems and, more particularly, relates to capturing and replaying provisioning components to solve provisioning and deployment problems.

BACKGROUND

User provisioning software is software intended to help organizations more quickly, cheaply, reliably, and securely manage information about users on multiple systems and applications. In today's computer systems, software is often installed before the computer is sold, and the purchaser may later want to add, update, or remove software. More and more of today's software systems are provisioned dynamically and are able to support extensions from the original software provider, the customer of the software system, and third-parties.

User provisioning refers to the creation, maintenance, and/or deactivation of user objects and user attributes, as they exist in one or more systems, directories, or applications, in response to automated or interactive business processes. User software may be provisioned on any computing environment that has individually configurable and/or upgradable components. User objects may represent employees, contractors, vendors, partners, customers, or other recipients of a service. Services may include electronic mail, inclusion in a published user directory, access to a database, access to a network or mainframe, etc. User provisioning is a type of identity management software, particularly useful within organizations, where users may be represented by multiple objects on multiple systems.

A trend of modern software systems is to "componentize" software into smaller pieces (components) to support re-use and targeted updates. This often involves support for multiple versions of the same component. Furthermore, provisioning may often involve running pre-provisioning and post-provisioning logic on the software system. For example, an active component in the runtime may involve deactivation before removal, and an added component may involve activation after installation.

An agent that provisions large, dynamic systems with large numbers of components, complicated interdependencies, and runtime scripting can fail in many ways, and it is often beyond a user's ability to diagnose such provisioning failures.

SUMMARY

The present disclosure teaches distilling a provisioning request and a pre-provisioning target in a target environment, and applying the provisioning request to the provisioning target in a way that a customer's proprietary data is stripped and the provisioning archive is smaller and more easily transmittable to a support organization. If a provisioning error is found, the provisioning error is added to the provisioning archive.

If a provisioning error has been found, the present disclosure teaches software support receiving a provisioning archive from the user computing environment, opening the provisioning archive, re-creating a provisioning request by inflating a distilled provisioning request, re-creating a provisioning target by inflating a distilled target environment, and applying the provisioning request to the provisioning target, resulting in the re-created provisioning error. Inflation restores substantially the same public metadata on the support computing environment as was present on the user computing environment. Inflation also generates shell code that may act as the proprietary information that was removed from the provisioning archive received by the support computing environment to re-create the substantially the same provisioning error. This allows the software support to replay and analyze the provisioning error that occurred on the user computer environment without accessing the user's proprietary information.

DETAILED DESCRIPTION

User computing environments that provision large, dynamic systems with a large number of components, complicated interdependencies, and runtime scripting can fail in many ways. It is often beyond the user's ability to diagnose such provisioning errors. This disclosure relates to a methodology and systems for capturing, transmitting, and re-creating the provisioning errors at a later time and potentially on different devices to allow software support staff to analyze and repair the provisioning errors and improve software functionality. The disclosed methodology and systems would not require a customer to provide large amounts of proprietary information to re-create the provisioning failure, thereby allowing software support staff to analyze the re-created provisioning errors without having access to the customer's proprietary data.

Figure 1:
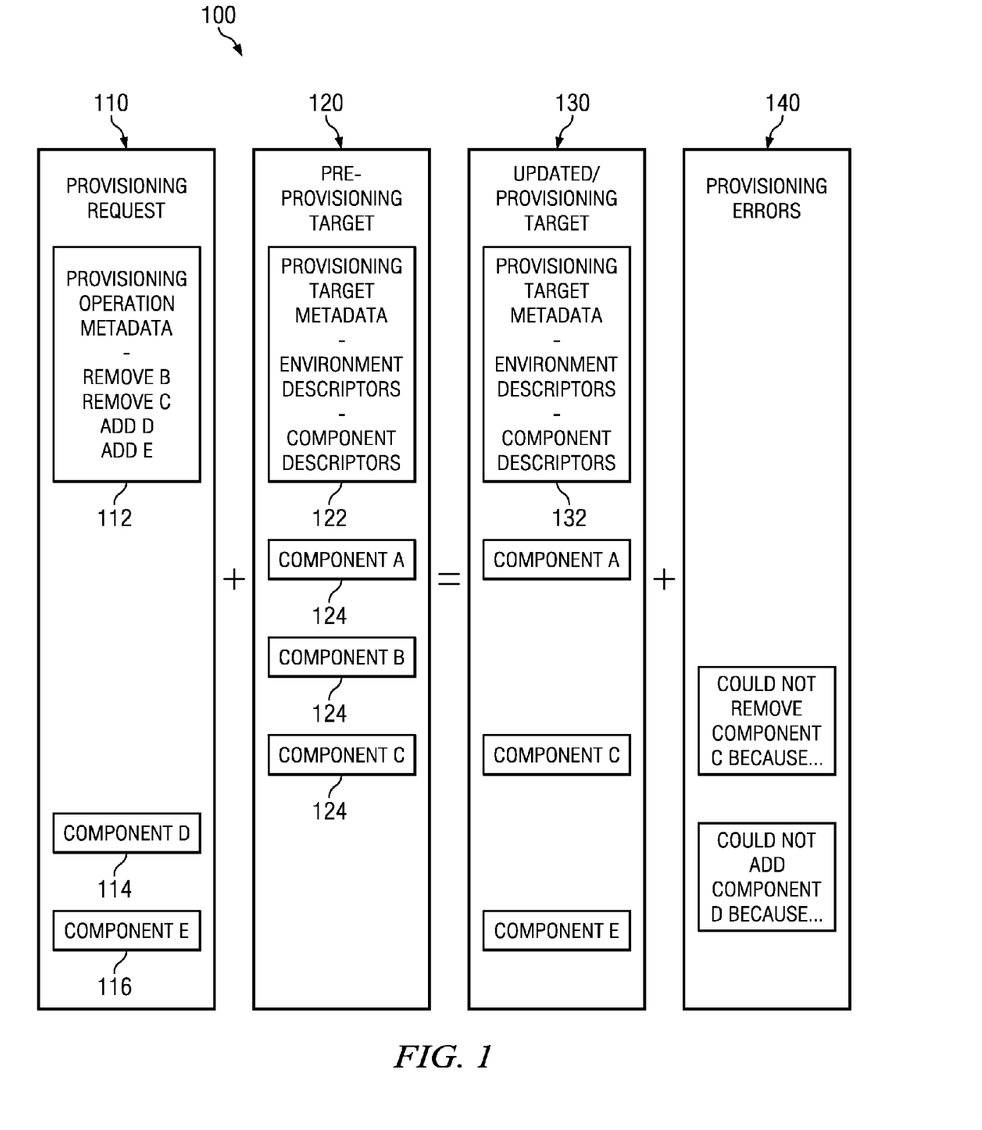
FIG. 1 is a schematic diagram of a high-level overview of provisioning components, in accordance with the present disclosure.

FIG. 1 is a schematic diagram of a high-level overview of provisioning 100. Provisioning 100 may include a provisioning request 110 and a pre-provisioning target 120 that may yield an updated provisioning target 130 and perhaps provisioning errors 140.

The provisioning request 110 may be a request to change the provisioning target 120 in some way or ways by either adding, removing, and/or updating software components in a user computing environment. Updating may involve removing unwanted components and adding desired components. A component may include code or a metadata-like configuration. To add a new component, updating uses the actual component to be installed; however, to remove an existing component, updating may use an identifier as to what component is to be removed.

In FIG. 1, the provisioning request 110 may include provisioning operation metadata 112. The provisioning operation metadata 112 may include information about the desired provisioning operation. For example, a user may want to remove, for example, components B and C, while adding components D and E. Because removing a component may not use the actual component, the provisioning request 110 may only include the actual components to be added—components D and E 114, 116.

The pre-provisioning target 120 is a system that has components that are "plug-able"—i.e., a computing environment in which a user may add, update, and/or remove components. Examples of provisioning targets will be discussed in more detail in FIG. 2, but may include, for example, a mobile phone with application add-ons, a node in a cloud with different customer applications deployed, or a web server with different servlets. In FIG. 1, the pre-provisioning target 120 may include provisioning target metadata 122, environment descriptors, component descriptors, and existing components 124, for example, the existing components A, B, and C.

Applying the provisioning request 110 to the pre-provisioning target 120 may result in the updated provisioning target 130. Ideally, the updated provisioning target 130 would include the provisioning target metadata 132, the environment descriptors, and the component descriptors from the pre-provisioning target 120. In the example, the updated provisioning target 130 would ideally include the original component A and added components D and E, while components B and C would have been removed. However, the updated provisioning target 130 in the example in FIG. 1 actually includes components A, C, and E, meaning that some provisioning errors 140 occurred.

The provisioning errors 140 may be correlated to both the provisioning request 110 (e.g., removal of component C) and the component itself (e.g., while preparing component C for removal, it could not be deactivated first). Therefore, the provisioning errors 140 in FIG. 1 may include both the request and the component identifier for removing component C and both the request and the component for adding component D.

Advantageously, the present disclosure teaches creating a provisioning archive of the provisioning request 110, the pre-provisioning target 120, and the provisioning errors 140 such that the user's proprietary data is stripped, the archive is smaller and more easily transmittable to a support organization, and the support organization can re-create the provisioning errors 140 for software issue resolution.

Figure 2:
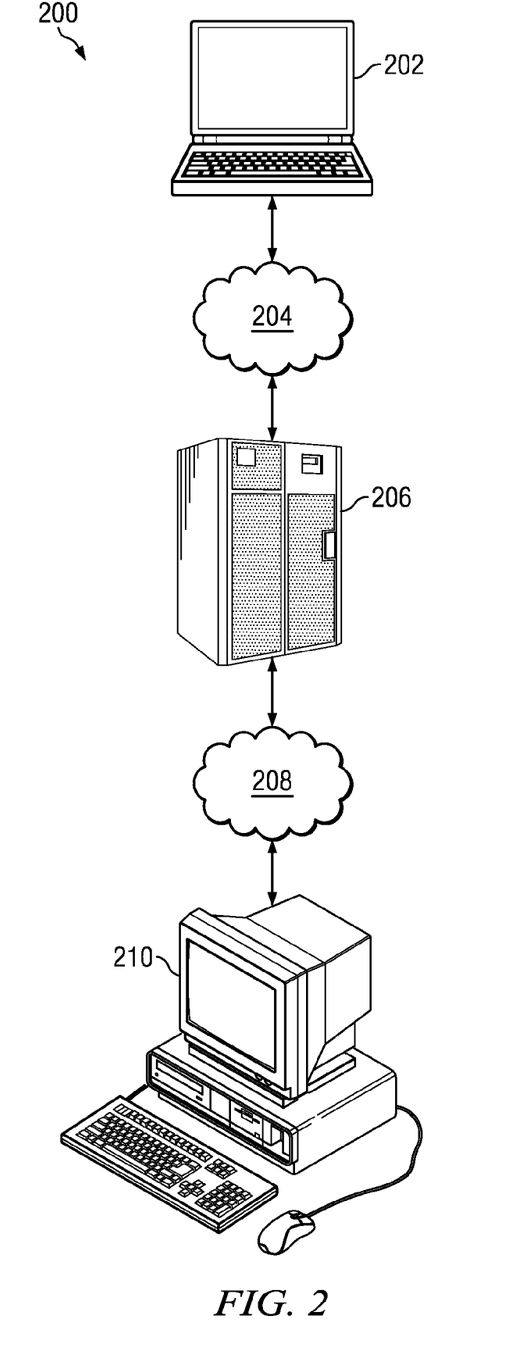
FIG. 2 is a system level diagram for the methods of distilling and re-creating provisioning errors that may occur during the provisioning of a user computing environment, in accordance with the present disclosure.

FIG. 2 is a system level diagram of a system for distilling and re-creating provisioning errors 200 that may occur during the provisioning of a user computing environment. FIG. 2 includes a user computing environment 202. Very generally, the user computing environment 202 may be comprised of any computer environment with individually configurable and/or upgradable components. Examples may include, but are not limited to, a desktop computer, a laptop computer, a network or cloud computer, a tablet computer, a smart phone such as an iPhone, a home automation device, or any other device with configurable software components.

The user computing environment 202 may be in direct communication with a plurality of servers 206 or may be in communication with the servers 206 via a network connection 204. In an embodiment, the user computing environment 202 may be in communication with the servers 206 via the internet 204. A support computing environment 210 may be located separate from the user computing environment 202 and may be in direct communication with the plurality of servers 206 or may be in communication with the servers 206 via a network connection 208. In an embodiment, the support computing environment 210 may be in communication with the servers 206 via the internet 208. Like the user computing environment 202, very generally, the support computing machine 210 may be comprised of any computer environment with individually configurable and/or upgradable components. The support computing environment 210 may be any device with configurable software components that may be configured to re-create provisioning errors that occurred on the user computing environment 202.

At a high level, a user of the user computing environment 202 may start a provisioning process which may trigger the creation of a provisioning archive. The provisioning archive may include a provisioning target, a provisioning request, and provisioning components. If a provisioning error occurs during the provisioning process at the user computing environment 202, a distilled provisioning archive may be transmitted to the support computing environment 210. Distillation filters proprietary content from the provisioning process, At the support computing environment 210, the distilled provisioning archive may be inflated in order to re-create and replay the provisioning error from the user computing environment 202. Inflation results in an inflated provisioning target, an inflated provisioning request, and inflated components. The support computing environment 210 generates shell code to mimic proprietary data previously distilled from the provisioning components to inflate the distilled provisioning request. The provisioning archive may be replayed, and support staff may analyze and debug the provisioning errors.

Capturing Provisioning Failures

A provisioning failure may be captured and transmitted to a support computing environment for analysis if provisioning failures occur at a user computing environment. In an embodiment, a provisioning archive is used to record a provisioning failure. A provisioning archive may include a distilled provisioning request, a distilled provisioning target, one or more distilled components that may have been added to, removed from, and/or updated on the user computing environment, and one or more provisioning errors. Once the provisioning archive is created and if a provisioning failure is discovered during provisioning, the provisioning archive may be transmitted to the support computing environment where provisioning failures may be re-created by inflating the provisioning archive. Support staff may replay and analyze the provisioning failures on the support computing environment.

Figure 3:
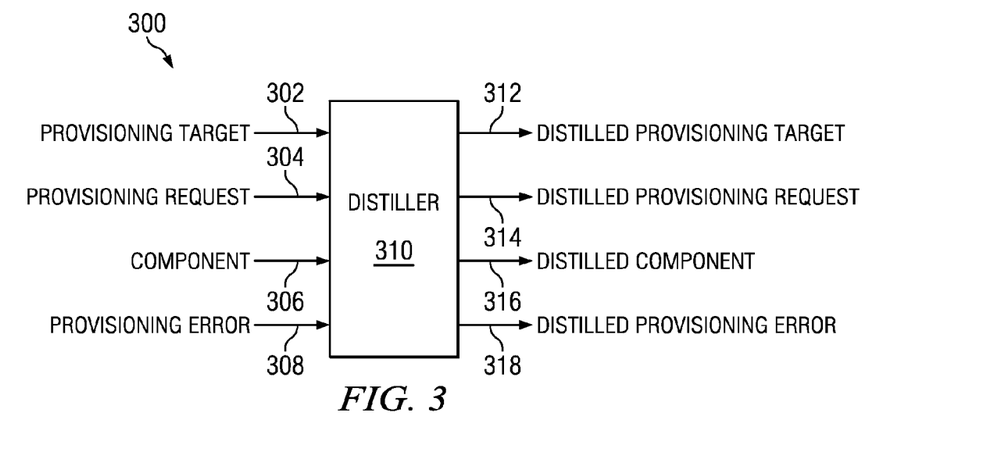
FIG. 3 is a schematic diagram illustrating a system for distilling a provisioning request, a provisioning target, a component, and a provisioning error, in accordance with the present disclosure.

FIG. 3 is a schematic diagram illustrating a system 300 for distilling a provisioning archive. A distiller 310 may be configured to receive a provisioning target 302, a provisioning request 304, a component 306, and a provisioning error 308 as inputs. The distiller 310 may perform a distillation process on the inputs. In an embodiment, the distillation process removes a user's proprietary information from inputs 302, 304, 306, 308, but still allows the inputs 302, 304, 306, and 308 to be sufficiently captured to describe their content. The distillation process may result in outputs comprised of a distilled provisioning target 312, a distilled provisioning request 314, a distilled component 316, and a distilled provisioning error 318 that will become a part of the distilled provisioning archive.

Figure 4:
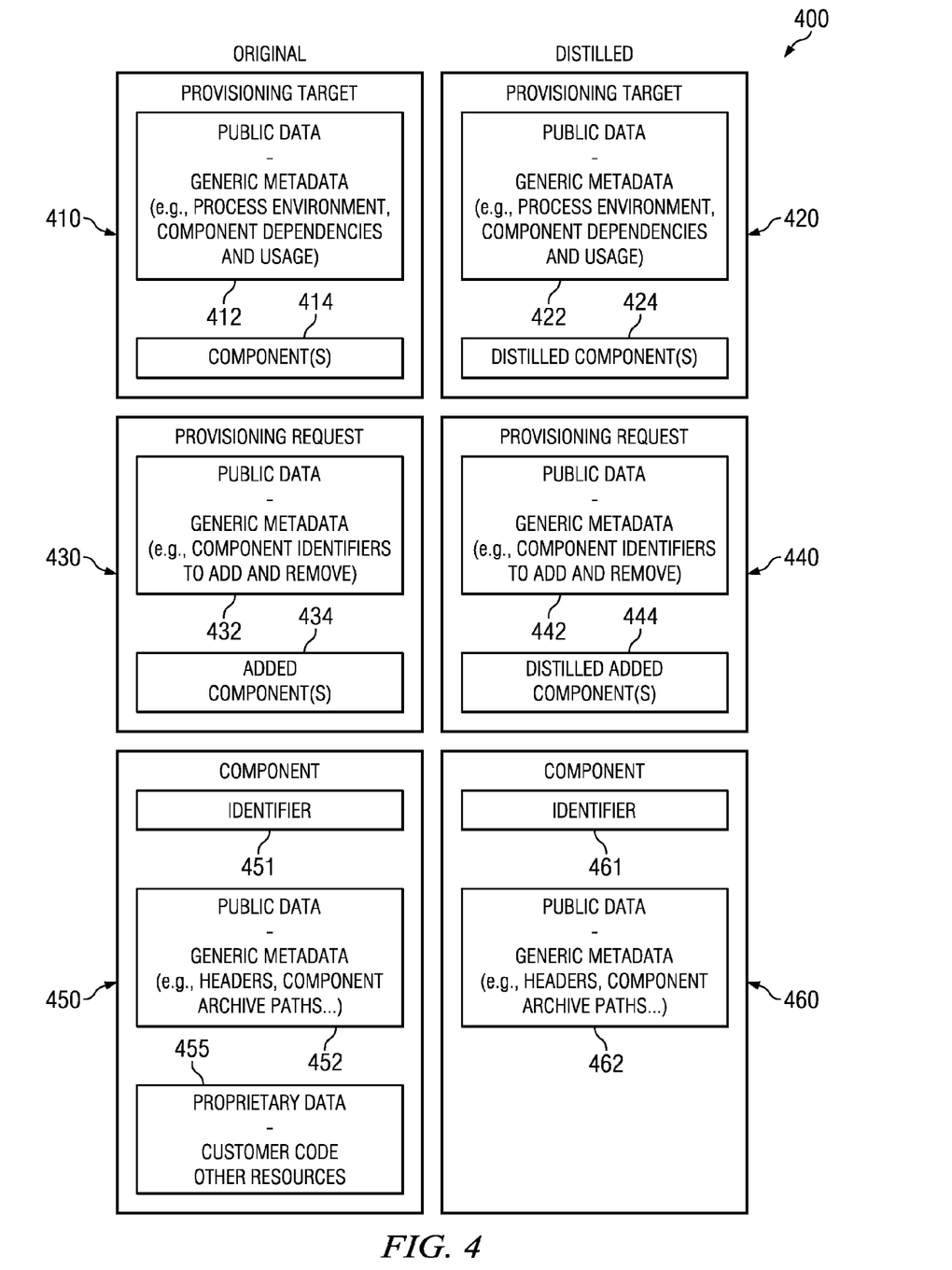
FIG. 4 is a schematic diagram illustrating an original and a distilled provisioning target, provisioning request, and provisioning component, in accordance with the present disclosure.

FIG. 4 is a schematic diagram 400 illustrating an original and a distilled version of a provisioning target 410, 420, a provisioning request 430, 440, and a provisioning component 450, 460, respectively. As described above in FIG. 3, distillation removes a user's proprietary information, but allows components to be sufficiently captured in order to allows the components to be re-created. In this context, capture refers to the software code's ability to describe the user's proprietary information that may have been previously distilled from the provisioning request, provisioning target, or components. The distillation process advantageously saves space while removing the user's proprietary information before the provisioning archive is transferred to the support computing environment. Distillation filters proprietary information from the provisioning process. The filtered descriptions can be included in a provisioning archive and sent to a support computing environment.

During the distillation process 400, an original provisioning target 410 may include "public" data 412 (e.g., generic metadata) and one or more components 414. The generic metadata 412 may include information about the process environment, component dependencies, and component usage, among other data. The actual form of the public data 412 may depend on the specific provisioning target. For example, the public metadata 412 available on a cell phone may be different from what is available to a Java Application, an OSGi runtime, or a J2EE server. Distillation of the original provisioning target 420 results in a distilled provisioning target 420. The distilled public data 422 may be the same as the original data 412, but the one or more distilled components 424 may have been filtered to remove proprietary information from the provisioning process.

In addition, during the distillation process 400, an original provisioning request 430 may include "public" data 432 (e.g., generic metadata) and one or more added components 434. The generic metadata 432 may include component identifiers for adding and removing components. Like the original provisioning target 410, the actual form of the public data 432 may depend on the specific provisioning request. For example, the public metadata 432 available on a cell phone may be different from what is available to a Java Application, an OSGi runtime, or a J2EE server. Distillation of the original provisioning request 430 results in a distilled provisioning request 440. The distilled public data 442 may be the same as the original metadata 432, but the one or more distilled added components 444 may have been filtered to remove proprietary information from the provisioning process.

Additionally, during the distillation process 400, an original component 450 may include an identifier 451, "public" data 452 (e.g., generic metadata), and proprietary data 455. The generic metadata 452 may include headers and component archive paths. Like the original provisioning target 410 and the original provisioning request 430, the actual form of the public meta 452 may depend on the specific component. For example, the proprietary data of the original component 450 may include code that includes a user's proprietary information. Distillation of the original component 450 results in a distilled component 460. The distilled identifier 461 may be the same as the original identifier 451, and the distilled public data 462 may be the same as the original metadata 452, but the proprietary data 455 may have been filtered from the original component 450 and may no longer be present in the distilled component 460. In the case of a Java component packaged as a Java Archive (JAR), the public data may include headers in the JAR manifest and a resource structure.

Figure 5:
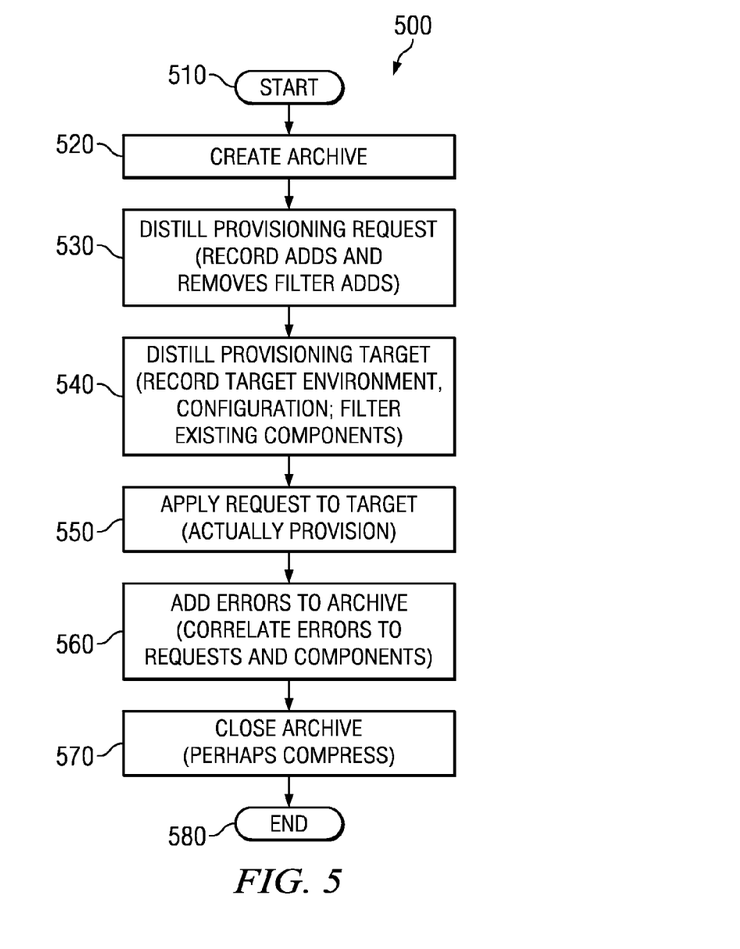
FIG. 5 is a flow chart illustrating provisioning at a user computing environment, in accordance with the present disclosure.

FIG. 5 is a flow chart illustrating a provisioning process 500 at a user computing environment. The provisioning process 500 begins at action 510. An archive is created at action 520. This archive is of the provisioning request, the pre-provisioning target, and any provisioning errors. This archive may be stripped of proprietary data. In an embodiment, the archive is smaller and more easily transmittable to a support computing environment. The archive may be used to re-create the provisioning error for issue resolution.

The provisioning request is distilled at action 530. Distilling the provisioning request may include recording a provisioning request component in the provisioning archive and filtering the provisioning request component. The provisioning request component may include a component requested to be added to, removed from, and/or updated in the user's computing environment. In an alternative embodiment, action 530 may include filtering more than one provisioning request component.

The provisioning target is distilled at action 540. Distilling the provisioning target may include recording a target environment in the provisioning archive and filtering an existing component of the target environment. In an alternative embodiment, action 540 may include filtering more than one existing component of the target environment.

The provisioning request is applied to the provisioning target at action 550. Applying the provisioning request may result in an updated provisioning target. The provisioning process may determine if provisioning errors occurred during action 550. If provisioning errors do occur, the same software code that is used in action 550 may later be used in FIG. 9 to re-create the same provisioning errors on the support computing environment, allowing support staff to analyze the provisioning errors.

If one or more provisioning errors are discovered during the provisioning process, the provisioning errors may be added to the provisioning archive at action 560. Additionally, the provisioning errors may be correlated to the provisioning requests and the provisioning request component to be used to re-create the provisioning errors on the support computing environment. The provisioning archive may be compressed, although compression is not required. The archive is closed at action 570. The provisioning process ends at action 580, and the provisioning archive may be transmitted to the support computing environment.

Figure 6:
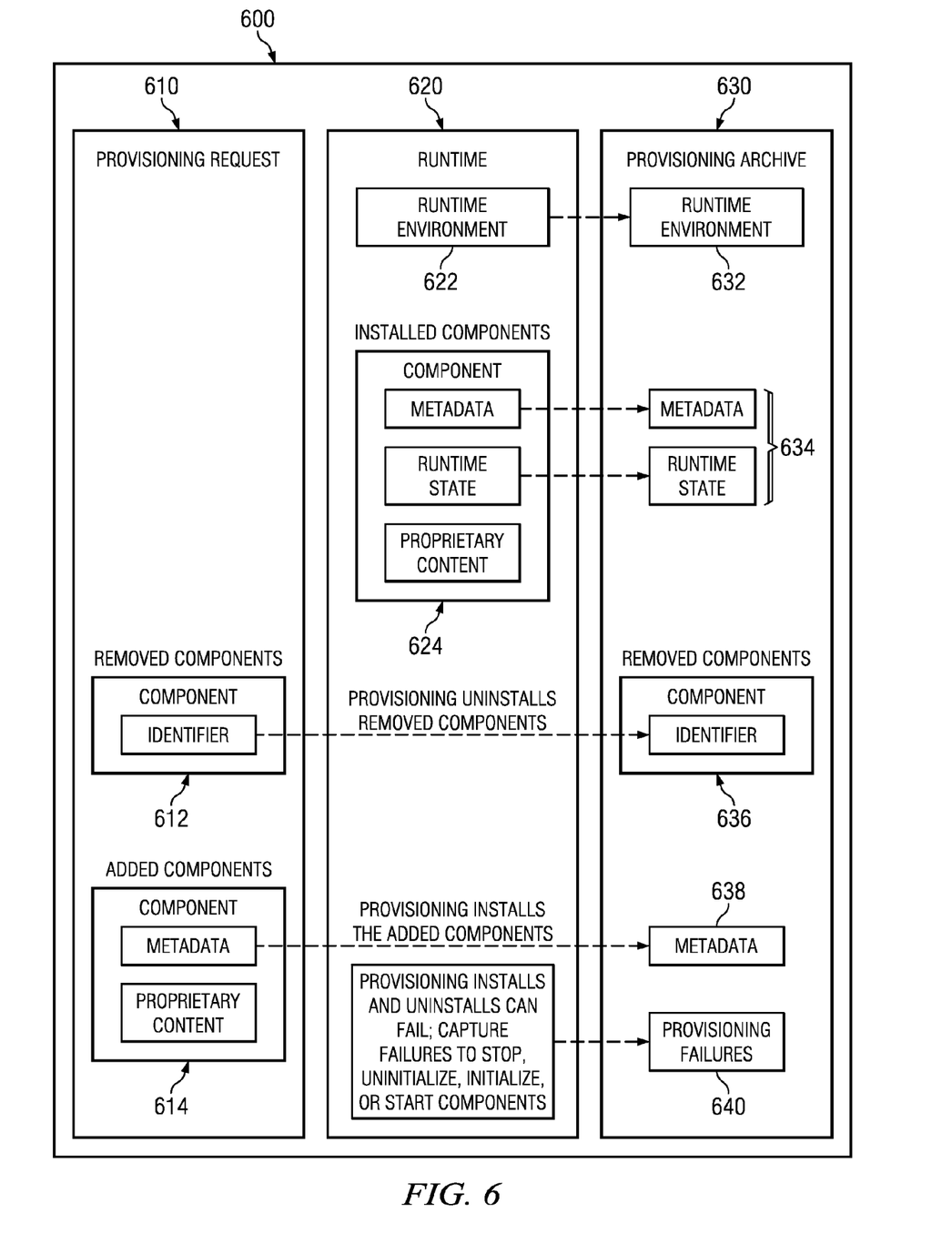
FIG. 6 is a schematic diagram illustrating provisioning at a user computing environment, in accordance with the present disclosure.

FIG. 6 is a schematic diagram illustrating a distillation process 600 at a user computing environment. The distillation process 600 may include a provisioning request 610, a runtime 620, and a provisioning archive 630. The provisioning request 610 may include both components to be removed 612 and components to be added 614. As discussed above in relation to FIG. 1, the components to be removed 612 use the identifier of the component, while the components to be added 614 use the actual component comprised of metadata and proprietary content specific to the user on the user computing environment.

The runtime 620 may comprise a runtime environment 622 and may include currently installed components 624. The currently installed components 624 may include metadata, a runtime state, and proprietary content specific to the user on the user computing environment.

The provisioning archive 630 may comprise a distilled runtime environment 632, distilled installed components 634 comprising distilled metadata, and a distilled runtime state recorded from the runtime installed components 624. In an embodiment, the provisioning archive 630 does not include proprietary content from the installed components 624 in the runtime 620. The proprietary content may be filtered from the provisioning request and the provisioning target before being recorded in the provisioning archive 630.

As previously discussed, the provisioning request 610 contains an identifier of the components to be removed 612. During provisioning, the runtime 620 may be configured to uninstall the components to be removed 612, which would be recorded in the distilled removed components 636 in the provisioning archive. The provisioning request 610 may also contain the metadata and the proprietary content of the components to be added 614. In the case of the components to be added 614, during provisioning, the runtime 620 may be configured to install the components to be added 614. In an embodiment, only public metadata 638 is recorded in the provisioning archive 630, and the provisioning archive 630 does not include proprietary content from the components to be added 614. In some embodiments, a portion of proprietary data is distilled from the components to be added 614. Any amount of proprietary content may be filtered from the provisioning request and the provisioning target before being recorded in the provisioning archive 630.

The provisioning archive 630 may also include provisioning errors 640 that may have occurred during the runtime 620 while the provisioning request was applied to the provisioning target. Provisioning failures that may lead to provisioning errors 640 may include, but are not limited to, failures to stop, un-initialize, initialize, or start components.

Referring now to FIGS. 3-6, during provisioning, the distilling mechanism may distill captured information to generate the provisioning archive. The following information surrounding the provisioning process may be distilled:

(1) A description of the components involved in the provisioning. The disclosed embodiments may capture a distillation of the components to be added, removed, and/or updated. The description of the components may be sufficient to describe their contents while, for the most part, not actually including the contents, which is significant for filtering the user's proprietary data and saving space in the provisioning archive.

(2) A description of the runtime that is being provisioned. The disclosed embodiments may capture a description of the runtime that is being provisioned, which will typically comprise a description of the system on which the runtime executes, as well as capturing the state of each component in the runtime.

(3) A description of the provisioning operation. The disclosed embodiments may capture the desired changes to the runtime represented by the provisioning operation. The description of the provisioning operation is typically a description of which components to add to the runtime and which components to remove from the runtime.

(4) A description of the provisioning errors. The disclosed embodiments may capture the provisioning errors in sufficient detail so that the replay mechanism can differentiate different modes of failure. Specifically, if a given component caused a failure in a post-provisioning step, the replay mechanism may correlate the failure to the component that caused it.

These descriptions may be woven together in a single provisioning archive, and often can be compressed to arrive at a convenient interchange format. The provisioning archive can be communicated to a support computing environment in the case of provisioning failures.

Re-Creating Provisioning Failures

A provisioning failure may be re-created by a support computing environment if a provisioning failure occurred at a user computing environment. In an embodiment, a distilled provisioning archive is used to re-create and replay a provisioning failure. The distilled provisioning archive may be transmitted to the support computing environment where the provisioning failures may be re-created by inflating the distilled provisioning archive. Support staff can replay and analyze the provisioning failures on the support computing environment.

Figure 7:
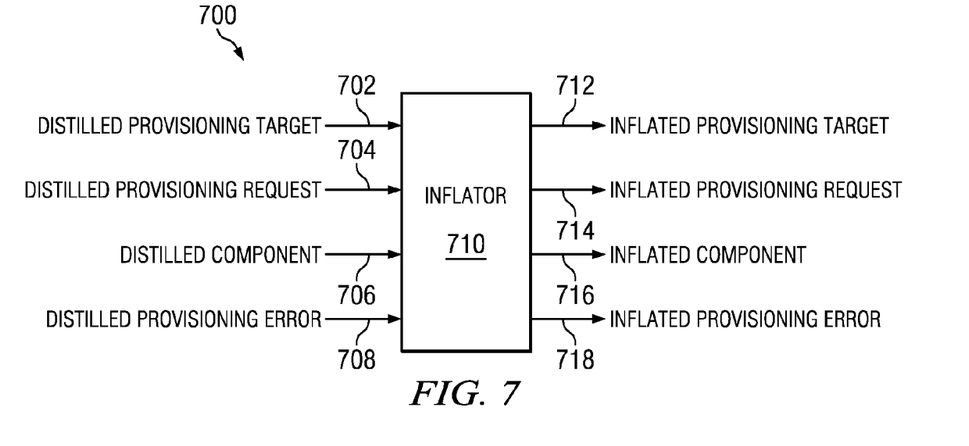
FIG. 7 is a schematic diagram illustrating a system for re-creating a provisioning request, a distilled provisioning target, a distilled component, and a distilled provisioning error, in accordance with the present disclosure.

FIG. 7 is a schematic diagram illustrating a system 700 for inflating a distilled provisioning archive. An inflator 710 may be configured to receive the distilled provisioning archive, including a distilled provisioning target 702, a distilled provisioning request 704, a distilled component 706, and a distilled provisioning error 708 as inputs. The inflator 710 may perform an inflation process on the inputs. In an embodiment, the inflation process restores public metadata from the distilled provisioning request and the distilled provisioning target and generates shell code designed to fail in the same way that the original provisioning failed. The inflation process may result in outputs comprised of an inflated provisioning target 712, an inflated provisioning request 714, an inflated component 706, and an inflated provisioning error 718 that may be used to replay and analyze the re-created provisioning failures.

Figure 8:
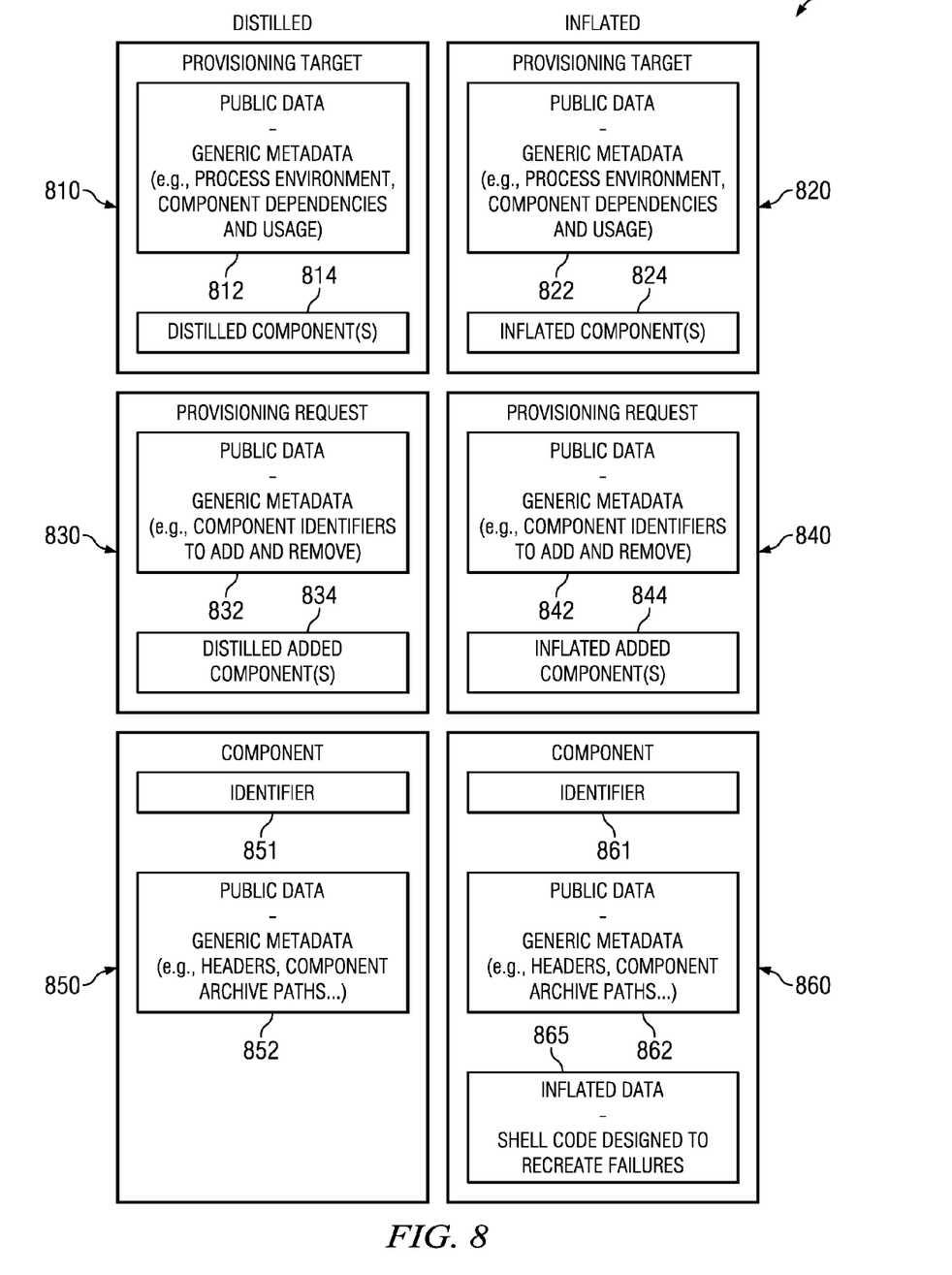
FIG. 8 is a schematic diagram illustrating a distilled and an inflated provisioning target, provisioning request, and provisioning component, in accordance with the present disclosure.

FIG. 8 is a schematic diagram 800 illustrating a distilled and an inflated version of a provisioning target 810, 820, a provisioning request 830, 840, and a provisioning component 850, 860, respectively. As described above in FIG. 7, inflation restores the public metadata to the distilled provisioning archive and generates shell code in the place of proprietary data that is designed to fail in the same way that the original provisioning failed. The shell code does not contain proprietary information that was distilled from the original provisioning archive, but the shell code may allow the support computing environment to re-create provisioning failures. Thus, when the provisioning is replayed by support staff, the same type of provisioning failure occurs and the provisioning failure can be debugged.

During the inflation process 800, a distilled provisioning target 810 may include "public" data 812 (e.g., generic metadata) and one or more distilled components 814. The generic metadata 812 may include information about the process environment, component dependencies, and component usage, among other data. The actual form of the public data 812 may depend on the specific provisioning target. For example, the public metadata 812 available on a cell phone may be different from what is available to a Java Application, an OSGi runtime, or a J2EE server. Inflation of the distilled provisioning target 810 results in an inflated provisioning target 820. The inflated public data 822 may be the same as the original metadata 812, but the one or more inflated components 814 may have been inflated with shell code in order re-create the same provisioning failure on the support computing environment.

In addition, during the inflation process 800, a distilled provisioning request 830 may include "public" data 832 (e.g., generic metadata) and one or more distilled added components 834. The generic metadata 832 may include component identifiers for adding and removing components. Like the distilled provisioning target 810, the actual form of the public data 832 may depend on the specific provisioning request. Inflation of the provisioning request 830 results in an inflated provisioning request 840. The inflated public data 842 may be the same as the original metadata 832, but the one or more inflated added components 844 may have been inflated with shell code in order to re-create the same provisioning failure on the support computing environment.

Additionally, during the inflation process 800, a distilled component 850 may include an identifier 851 and "public" data 852 (e.g., generic metadata). The generic metadata 852 may include information about headers and component archive paths. Like the distilled provisioning target 810 and the distilled provisioning request 830, the actual form of the public data 852 may depend on the specific provisioning target. After inflating the component 860, the inflated identifier 861 may be the same as the original identifier, and the inflated public data 862 may be the same as the original metadata 852. The inflated component 860 may include shell code of inflated data 865 designed to re-create the same provisioning failure on the support computing environment as the provisioning error that originally occurred on the user computing environment. In the case of a Java component packaged as a Java Archive (JAR), the public data may include headers in the JAR manifest and a resource structure.

For example, in an embodiment, if during provisioning it was necessary to start a component that had just been installed and its start failed, a provisioning error may have resulted. When generating the provisioning archive, the provisioning error may have been recorded to the provisioning archive and correlated to the failed component. The inflated component 860 may include the same generic data 862 as the original component, but the inflated component 860 would generate shell code of inflated data 865 whose start functionality would generate the same archived provisioning error.

Typically, the types of failures that can be re-created and the way in which shell code may be generated depends on the specific type of provisioning target and components. For example, in an embodiment, an OSGi component (i.e., a "bundle") can have a "bundle activator" with "start" and "stop" methods. If the original provisioning failed because a component could not start, the shell code may comprise a bundle activator whose start method would throw the same archived exception. Thus, when the original provisioning is re-created by support on the support computing environment, the same type of provisioning failure may occur. The re-created provisioning failure may be de-bugged with support tooling.

Figure 9:
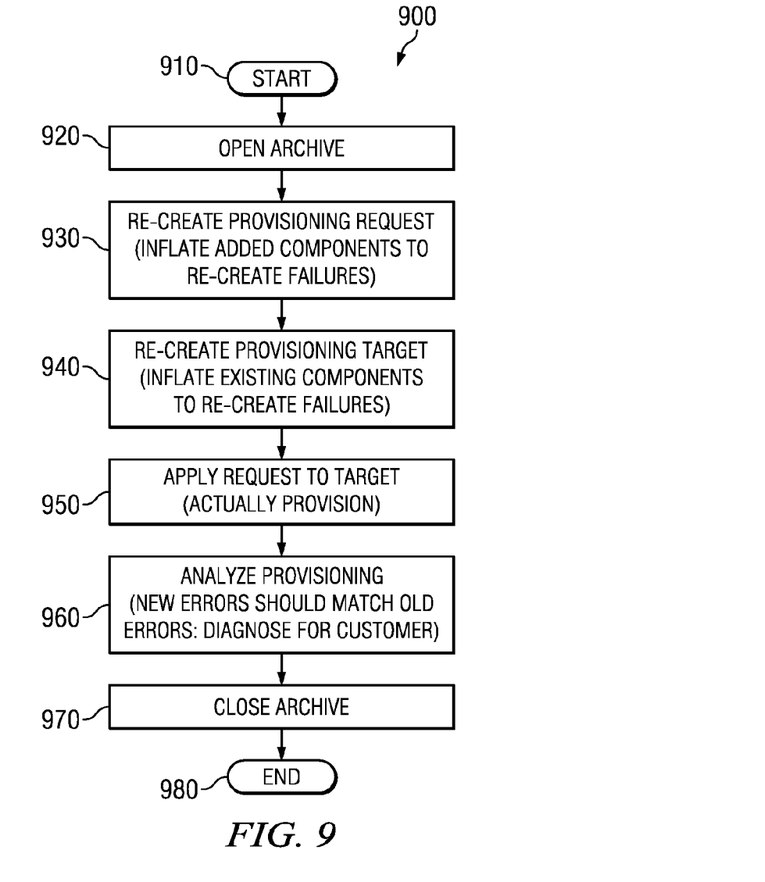
FIG. 9 is a flow chart illustrating re-creating a provisioning request and provisioning target at a support computing environment, in accordance with the present disclosure.

FIG. 9 is a flow chart illustrating a re-creating and replaying process 900 at a support computing environment. The re-creating process 900 begins at action 910. A archive is opened at action 920. This archive is of the distilled provisioning request, the distilled provisioning target, and any provisioning errors. This archive may have already been stripped of proprietary data during the distillation process. In an embodiment, the archive is smaller and more easily transmittable to a support computing environment.

The original provisioning request is re-created at action 930. Re-creating the provisioning request may include inflating a distilled provisioning request component in the archive to re-create provisioning failures. The inflated provisioning request component may comprise the same component requested to be added to, removed from, and/or updated as the component in the user's computing environment. In an alternative embodiment, action 930 may include inflating more than one provisioning request component.

The provisioning target is re-created at action 940. Re-creating the provisioning target may include inflating a target environment in the archive and inflating an existing component of the distilled target environment to re-create the same provisioning failures. In an alternative embodiment, action 940 may include filtering more than one existing components of the target environment.

The provisioning request is applied to the provisioning target at action 950, including provisioning the target environment. Applying the provisioning request may result in replay of same provisioning target that was created at action 550 above in FIG. 5. The same software code that was used to apply the provisioning request to the provisioning target at action 550 above in FIG. 5 may be used here to re-create the same provisioning errors at the support computing environment.

The one or more provisioning errors that were discovered during the original provisioning process and re-created at action 950 may be replayed and analyzed at action 960. The new, re-created errors should match the original provisioning errors, thereby allowing support staff at the support computing environment to analyze the re-created provisioning errors. Advantageously, the re-created provisioning errors do not include proprietary data. Support staff may diagnose the re-created errors and debug the original cause of the provisioning failures. Additionally, the disclosed embodiments allow support staff to use additional diagnostic tooling to debug the original cause of the provisioning failures.

The provisioning archive may be closed at action 970. The re-creation process ends at action 980.

Figure 10:
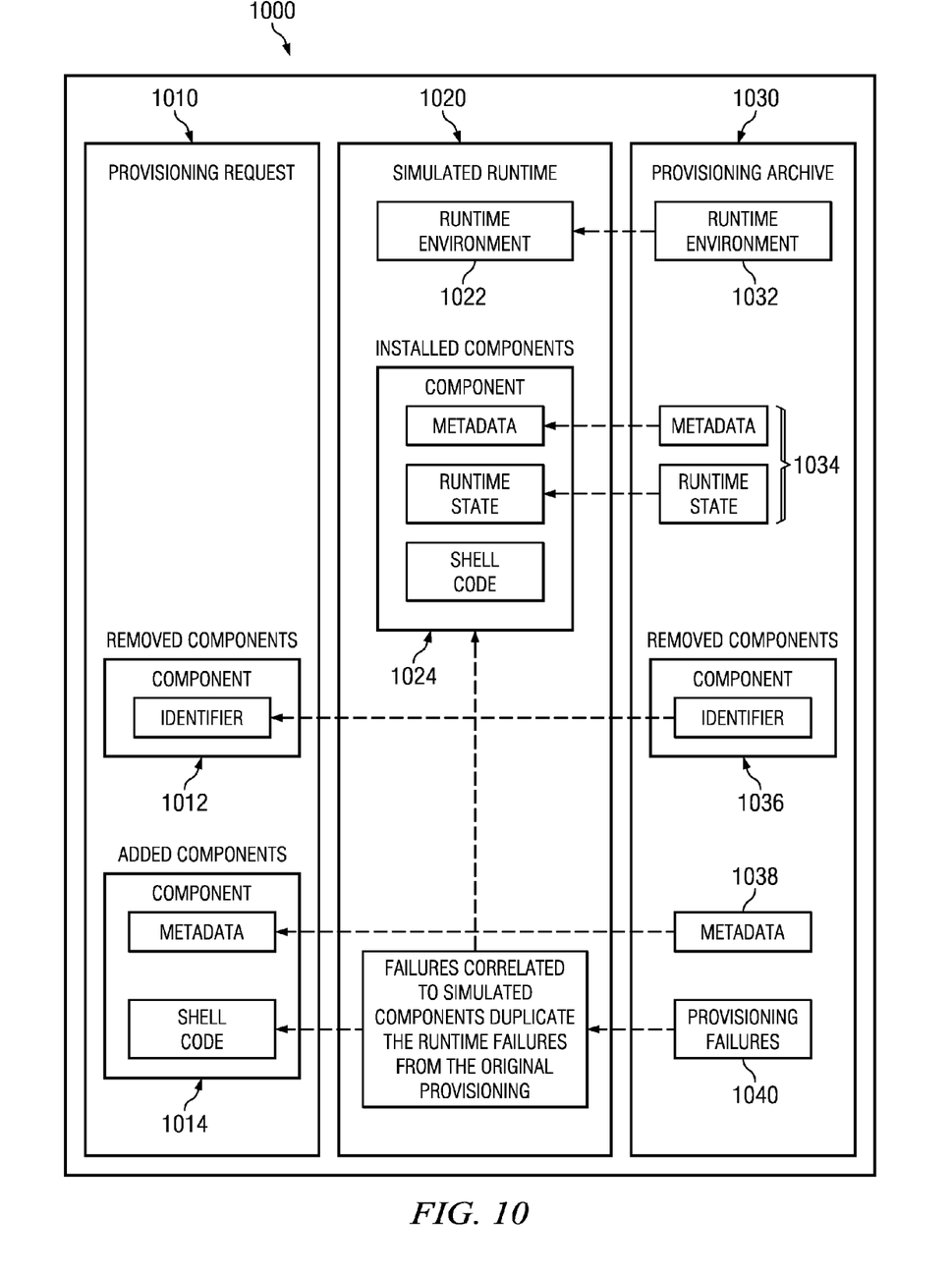
FIG. 10 is a schematic diagram illustrating re-creating at a support computing environment, in accordance with the present disclosure.

FIG. 10 is a schematic diagram illustrating a re-creation process 1000 at a support computing environment. The re-creation process 1000 may include a provisioning request 1010, a simulated runtime 1020, and a provisioning archive 1030.

The provisioning request 1010 may include both components to be removed 1012 and components to be added 1014. As discussed above in relation to FIG. 1, the components to be removed 1012 use the identifier of the component, while the components to be added 1014 use the actual component comprised of metadata and shell code content. The shell code content may be configured to inflate the distilled component in place of any proprietary content that was filtered from the components in order to re-create provisioning errors.

The simulated runtime 1020 may be simulated in a runtime environment 1022 and may include currently installed components 1024. The currently installed components 1024 may include metadata, a runtime state, and the shell content that replaces the proprietary content that was specific to the user on the user computing environment.

The provisioning archive 1030 may comprise an inflated runtime environment 1032 and inflated installed components 1034 comprising inflated metadata and an inflated runtime state inflated from the simulated runtime installed components 1024. As previously discussed, in an embodiment, the provisioning archive 1030 does not include proprietary content that would have been filtered from the provisioning request and the provisioning target before being recorded in the original provisioning archive. The shell content in the components to be added 1014 and in the currently installed components 1024 may correlate to previously distilled proprietary data in order to duplicate the runtime provisioning failures from the original provisioning.

The provisioning archive 1030 may contain an identifier 1036 of the components to be removed 1012 from the re-created provisioning request 1010. During re-creation, the identifier 1036 may re-create removal by removing the identified component from the provisioning archive 1030, which may re-create any provisioning errors 1040 that may have occurred when the original provisioning request was applied to the provisioning target during the original runtime.

The provisioning request 1010 may also contain the metadata and the shell content of the components to be added 1014. In the case of the components to be added 1014, during re-creation, the simulated runtime 1020 may be configured to install the components that were previously added, but only the public metadata 1038 would be inflated in the provisioning archive 1030. The provisioning archive 1030 may not include proprietary content. The proprietary content may be inflated as shell code from the provisioning request 1010 and the provisioning target before being re-created in the provisioning archive 1030.

The provisioning archive 1030 may re-create any provisioning errors 1040 that may have occurred when the original provisioning request was applied to the provisioning target during the original runtime. The re-created provisioning failures that may lead to provisioning errors 1040 may include, but are not limited to, failures to stop, un-initialize, initialize, or start components.

Referring now to FIGS. 7-10, the re-created inflated provisioning archive may be used to replay the provisioning failures on the support computing machine. The provisioning archive may be used in a simulated runtime to re-create the provisioning failures of the original provisioning operation. In an embodiment, the re-created provisioning archive may:

(1) Re-create a recorded component representing the components involved in the original provisioning failure. The components may be re-constructed in the simulated runtime before the provisioning operation, including the components to be removed by the provisioning operation and the components that are to be added to the simulated runtime by the provisioning operation. A component that correlates to a deactivation or activation provisioning error should be reconstructed with shell code that will fail in the same way during replay. Shell content may include generated code used for reproducing failures in original provisioning that correlates to a failed component.

(2) Reconstruct a simulated runtime in substantially the same state as the original runtime. The simulated runtime includes the components in the runtime before the provisioning and the restoration of any peripheral state native to the runtime in question. A debugger may be attached to the simulated runtime as provisioning is replayed or other tools may be used to explore the re-created provisioning failures.

(3) Re-apply the described provisioning to the re-constructed runtime. This will typically occur in an environment with additional tooling available. For example, the replay might involve attaching a Java debugger in an environment with access to the source code itself and the ability to probe private provisioning data structures without including the customer's proprietary information.

Note that the additional metadata that describes the source environment can be used to translate to another machine. For example, on a Java system the system environment will capture the directory and path separator characters, which can be used to translate file paths from the source environment to the replay environment.

OSGi-Related Embodiment

In an embodiment, the provisioning and re-creation provisioning processes may be applied to an OSGi (Open Services Gateway initiative) runtime environment. The OSGi framework may be a modular system and service platform for the Java programming language that implements a substantially complete and dynamic component model. The OSGi technology is a set of specifications that define a dynamic component system for Java. These specifications may enable a development model where applications are dynamically composed of many different reusable components. The OSGi specifications may enable components to hide their implementations from other components while communicating through services, which are objects that are specifically shared between components.

The OSGi runtime itself, often called a framework, has an associated set of "framework properties" that describe more aspects of the runtime. An OSGi runtime may be hosted in a Java runtime. In an embodiment, the Java runtime is an operating system process, which itself has various environment properties. In an embodiment, this is captured as metadata, as discussed above in relation to FIG. 6.

The basic unit of software in an OSGi environment is a "bundle." A bundle comprises resources such as executable Java code, native libraries, and other data. OSGi defines a set of custom headers that describe the relationships between components. A bundle has a well-defined life cycle state in the runtime. A bundle can have a "bundle activator" that will be called when the component is started or stopped; that is, enters or leaves its active state. The OSGi embodiment of this disclosure captures the OSGi metadata in each component and the bundle's state. Java classes, embedded Java archives, native libraries, and the resources in each component are stripped out; only their existence is captured. This enables the OSGi runtime to operate as expected given the bundle class path and its distilled content. Moreover, any bundle whose activator caused a provisioning failure will be given an activator stub that will fail in the same way as the original component.

Provisioning an OSGi runtime can be a complex problem, especially when the target runtime already has a number of components. Each component, either an OSGi bundle or an Eclipse feature, may be viewed as both providing and requiring constraints. Provisioning involves evaluating and satisfying these constraints, and, at times, optimizing their solutions. The provisioning and deployment problem becomes more and more complex as the number of components rises, and can result in one or more failures. Some failures are relatively obvious, but many are difficult to pin down, and may be beyond the ability of less-sophisticated users to diagnose.

In an embodiment, substantially all metadata involved in the provisioning operation is captured in a snapshot format that can be easily transmitted and replayed later in order to duplicate the customer issue, as discussed above in relation to FIGS. 3-10.

While various embodiments have been described above, it should be understood that they have been presented by way of example only, and not limitation. Thus, the breadth and scope of a preferred embodiment should not be limited by any of the above described exemplary embodiments, but should be defined only in accordance with the claims and their equivalents for any patent that issues claiming priority from the present provisional patent application.

For example, as referred to herein, a machine or engine may be a virtual machine, computer, node, instance, host, or machine in a networked computing environment. Also as referred to herein, a networked computing environment is a collection of machines connected by communication channels that facilitate communications between machines and allow for machines to share resources. Network may also refer to a communication medium between processes on the same machine. Also as referred to herein, a server is a machine deployed to execute a program operating as a socket listener and may include software instances.

Resources may encompass any types of resources for running instances including hardware (such as servers, clients, mainframe computers, networks, network storage, data sources, memory, central processing unit time, scientific instruments, and other computing devices), as well as software, software licenses, available network services, and other non-hardware resources, or a combination thereof.

A networked computing environment may include, but is not limited to, computing grid systems, distributed computing environments, cloud computing environment, etc. Such networked computing environments include hardware and software infrastructures configured to form a virtual organization comprised of multiple resources which may be in geographically disperse locations.

Various terms used herein have special meanings within the present technical field. Whether a particular term should be construed as such a "term of art," depends on the context in which that term is used. "Connected to," "in communication with," or other similar terms should generally be construed broadly to include situations both where communications and connections are direct between referenced elements or through one or more intermediaries between the referenced elements, including through the Internet or some other communicating network. "Network," "system," "environment," and other similar terms generally refer to networked computing systems that embody one or more aspects of the present disclosure. These and other terms are to be construed in light of the context in which they are used in the present disclosure and as those terms would be understood by one of ordinary skill in the art would understand those terms in the disclosed context. The above definitions are not exclusive of other meanings that might be imparted to those terms based on the disclosed context.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result.

What is claimed is:

1. A method for archiving provisioning errors that may occur during provisioning of a computing environment having configurable components, the method comprising:
    distilling a provisioning request, wherein the distilling the provisioning request includes recording, in a provisioning archive, a provisioning request component, and filtering the provisioning request component, the provisioning request component comprising a component requested to be added to, removed from, and/or updated in the computing environment;
    distilling a provisioning target, wherein the distilling the provisioning target includes recording, in the provisioning archive, a target environment, and filtering an existing component of the target environment;
    applying the provisioning request to the provisioning target, including provisioning the target environment, resulting in an updated provisioning target;
    determining if a provisioning error occurred; and
    adding the provisioning error, if any, to the provisioning archive.

2. The method of claim 1, further comprising creating the provisioning archive of the computing environment prior to the distilling the provisioning request.

3. The method of claim 1, wherein filtering the provisioning request component comprises removing proprietary information from the provisioning request component recorded in the provisioning archive.

4. The method of claim 1, wherein filtering the target environment comprises further removing proprietary information from the target environment recorded in the provisioning archive.

5. The method of claim 1, wherein the provisioning error is correlated to the provisioning request and the provisioning request component.

6. The method of claim 1, further comprising closing the provisioning archive.

7. The method of claim 6, further comprising one of:
    re-creating the provisioning archive on the first computing environment for analysis of the provision archive and the provisioning error; and
    transmitting the provisioning archive to a second computing environment for analysis of the provisioning archive and the provisioning error without transmitting any proprietary information.

8. The method of claim 1, wherein determining further comprises determining if a plurality of provisioning errors occurred, and wherein adding comprises adding the plurality of provisioning errors, if any, to the provisioning archive.

9. The method of claim 1, wherein the distilling the provisioning request includes recording a plurality of provisioning request components.

10. The method of claim 1, wherein the distilling the provisioning request and the distilling the provisioning target are applied to an OSGi runtime environment.

11. A method for re-creating at a first computing environment a provisioning error that occurred on a second computing environment having configurable components for analysis at the first computing machine, the method comprising:
    receiving a provisioning archive from the second computing machine;
    opening the provisioning archive;
    re-creating a provisioning request, wherein the re-creating the provisioning request includes inflating a distilled provisioning request component resulting in an inflated provisioning request component;
    re-creating a provisioning target, wherein the re-creating the provisioning target includes inflating a distilled target environment; and
    applying the provisioning request to the provisioning target, including provisioning the target environment, resulting in the re-created provisioning error.

12. The method of claim 11, wherein the inflated provisioning request component restores substantially the same public metadata on the second computing environment as was present on the first computing environment at the time of the provisioning error.

13. The method of claim 11, wherein the inflated provisioning request component generates shell code that may act as proprietary information that was previously removed from the provisioning archive received from the second computing environment.

14. The method of claim 11, wherein the inflated provisioning request component re-creates the provisioning error from the second computing environment onto the first computing environment.

15. The method of claim 14, wherein the inflated provisioning request component re-creates the provisioning error onto the first computing environment without including proprietary information.

16. The method of claim 15, wherein the inflated provisioning request component re-creates more than one provisioning error.

17. The method of claim 11, further comprising analyzing the re-created provisioning error.

18. The method of claim 17, wherein the analyzing is conducted for de-bugging purposes.

19. The method of claim 11, wherein the re-creating the provisioning error is applied to an OSGi runtime environment.

20. The method of claim 11, further comprising closing the provisioning archive on the second computing environment.

* * * * *